(12) United States Patent
Nakamura et al.

(10) Patent No.: US 10,312,519 B2
(45) Date of Patent: Jun. 4, 2019

(54) METHOD FOR MANUFACTURING ELECTROCONDUCTIVE PASTE, AND ELECTROCONDUCTIVE PASTE

(71) Applicant: SHOW DENKO K.K., Tokyo (JP)

(72) Inventors: Takeshi Nakamura, Tokyo (JP); Yuta Hirano, Tokyo (JP); Akihiro Kitazaki, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 6 days.

(21) Appl. No.: 15/529,561

(22) PCT Filed: Nov. 19, 2015

(86) PCT No.: PCT/JP2015/082526
§ 371 (c)(1),
(2) Date: May 25, 2017

(87) PCT Pub. No.: WO2016/084697
PCT Pub. Date: Jun. 2, 2016

(65) Prior Publication Data
US 2017/0331112 A1    Nov. 16, 2017

(30) Foreign Application Priority Data
Nov. 26, 2014   (JP) ................................ 2014-238819

(51) Int. Cl.
*H01M 4/62*     (2006.01)
*H01M 4/04*     (2006.01)
(Continued)

(52) U.S. Cl.
CPC .............. *H01M 4/62* (2013.01); *C01B 32/05* (2017.08); *H01B 1/24* (2013.01); *H01B 13/00* (2013.01); *H01G 11/36* (2013.01); *H01G 11/38* (2013.01); *H01G 11/86* (2013.01); *H01M 2/26* (2013.01); *H01M 4/043* (2013.01); *H01M 4/139* (2013.01); *H01M 4/625* (2013.01);
(Continued)

(58) Field of Classification Search
None
See application file for complete search history.

(56) References Cited

U.S. PATENT DOCUMENTS

2011/0163274 A1   7/2011   Plee et al.
2011/0256454 A1   10/2011  Nicolas et al.
(Continued)

FOREIGN PATENT DOCUMENTS

EP   2 682 517 A2   1/2014
EP   2 682 518 A2   1/2014
(Continued)

OTHER PUBLICATIONS

International Search Report of PCT/JP2015/082526 dated Jan. 26, 2016.
(Continued)

*Primary Examiner* — Jonathan Crepeau
(74) *Attorney, Agent, or Firm* — Sughrue Mion, PLLC

(57) ABSTRACT

A method for producing an electrically conductive paste, including a step of manufacturing paste A by exerting a cavitation effect in mixed liquid A containing multi-walled carbon nanotubes and a solvent, a step of manufacturing paste B from mixed liquid B containing carbon black particles, graphitized carbon nanofibers and a solvent, and a step of mixing paste A and paste B.

4 Claims, 4 Drawing Sheets

(51) Int. Cl.
  *H01G 11/38* (2013.01)
  *H01M 4/139* (2010.01)
  *H01B 1/24* (2006.01)
  *H01G 11/86* (2013.01)
  *H01B 13/00* (2006.01)
  *C01B 32/05* (2017.01)
  *H01M 2/26* (2006.01)
  *H01G 11/36* (2013.01)

(52) U.S. Cl.
  CPC .......... *H01M 2220/20* (2013.01); *Y02E 60/13* (2013.01); *Y02T 10/7022* (2013.01)

(56) References Cited

U.S. PATENT DOCUMENTS

| | | |
|---|---|---|
| 2012/0171566 A1 | 7/2012 | Yoshitake et al. |
| 2012/0214070 A1 | 8/2012 | Yamamoto et al. |
| 2014/0272596 A1 | 9/2014 | Yamamoto et al. |

FOREIGN PATENT DOCUMENTS

| | | |
|---|---|---|
| EP | 2 760 067 A1 | 7/2014 |
| EP | 2 778 266 A1 | 9/2014 |
| EP | 2 787 044 A1 | 10/2014 |
| JP | 4835881 B2 | 12/2011 |
| JP | 2012-501515 A | 1/2012 |
| JP | 5497220 B1 | 5/2014 |
| KR | 10-2014-0004597 A | 1/2014 |
| WO | 2012/111688 A1 | 8/2012 |

OTHER PUBLICATIONS

Communication dated Jun. 1, 2018 from the European Patent Office in counterpart Application No. 15863577.1.

[Fig. 1]
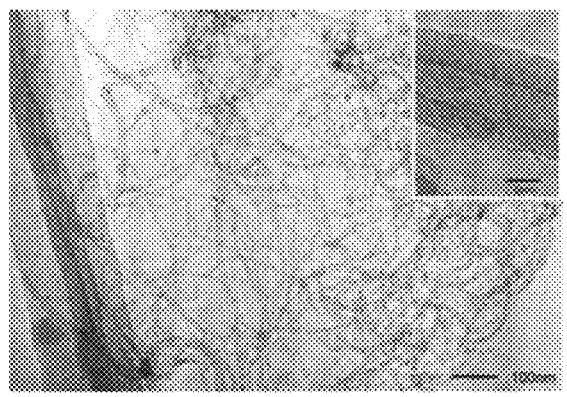
{Fig. 2}
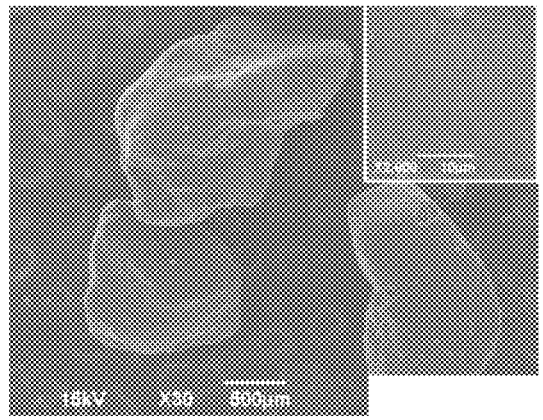
[FIG. 3]
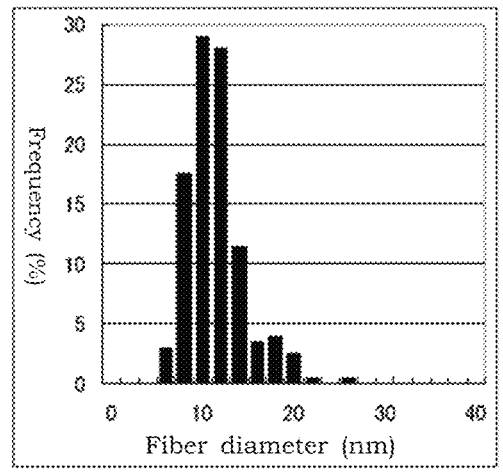

[Fig. 4]
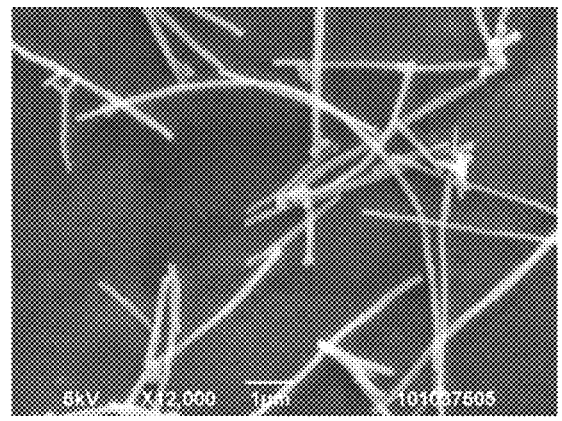
[Fig. 5]
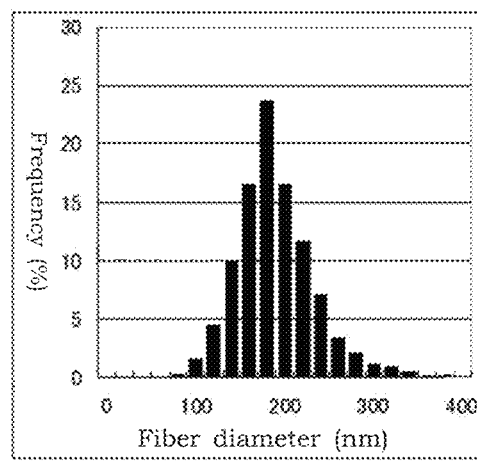
[Fig. 6]
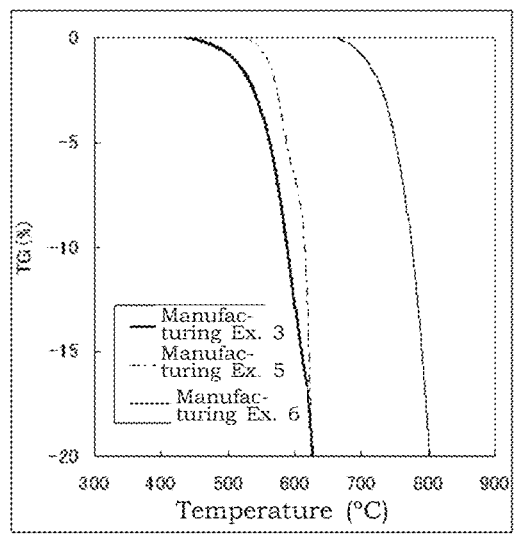

[Fig. 7]
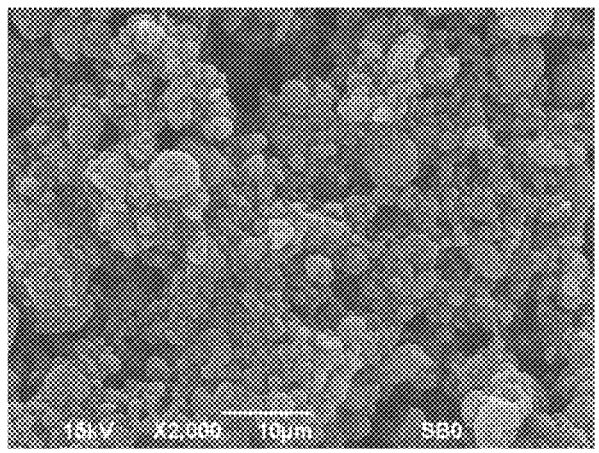
[Fig. 8]
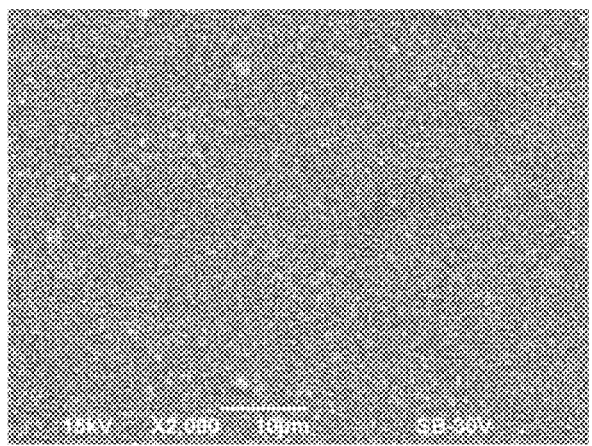
[Fig. 9]
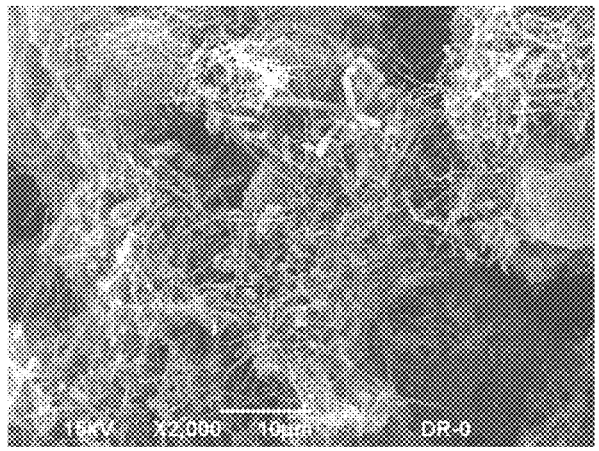

[Fig. 10]
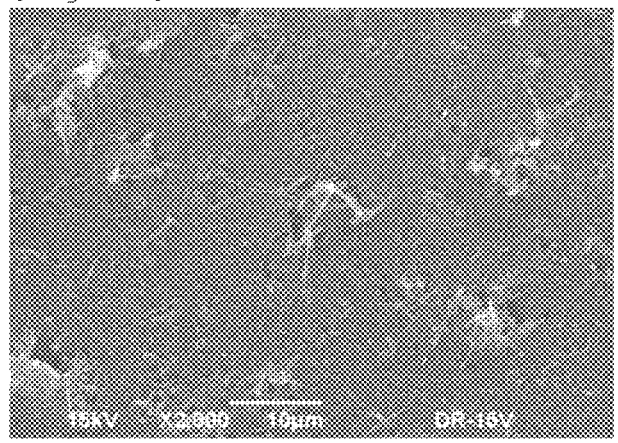
[Fig. 11]
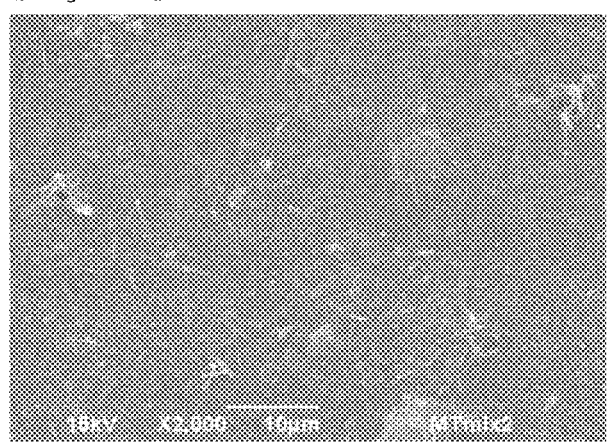
[Fig. 12]
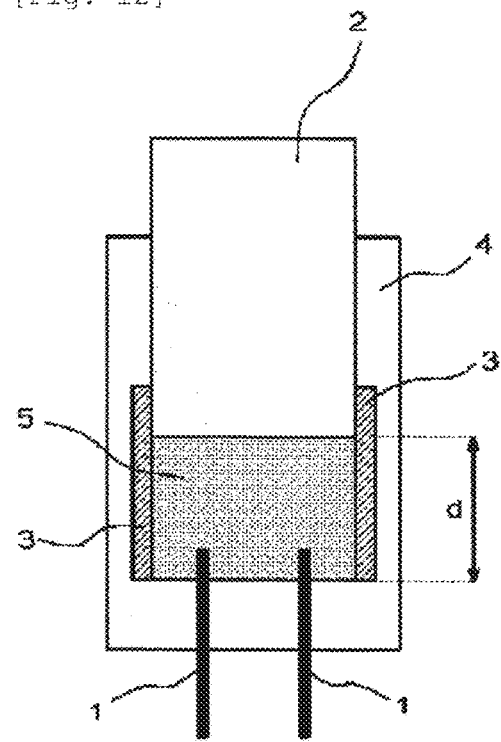

METHOD FOR MANUFACTURING ELECTROCONDUCTIVE PASTE, AND ELECTROCONDUCTIVE PASTE

CROSS REFERENCE TO RELATED APPLICATIONS

This application is a National Stage of International Application No. PCT/JP2015/082526 filed Nov. 19, 2015, claiming priority based on Japanese Patent Application No. 2014-238819 filed Nov. 26, 2014, the contents of all of which are incorporated herein by reference in their entirety.

TECHNICAL FIELD

The present invention relates to a method for producing an electrically conductive paste, and an electrically conductive paste. Specifically, the present invention relates to an electrically conductive paste which is easily dispersed in an electrode for a secondary battery and the like without leaving aggregates of electrically conductive materials, and has an excellent effect to improve a low-temperature property.

BACKGROUND ART

Further progress is expected in lithium ion batteries for automobile use and for power storage use, and there is a growing demand for a low-temperature property in addition to a low resistance and a long product life. A conductive assistant is gaining importance as a material essential for attaining improvement of the battery properties. Examples of a major conductive assistant include carbon nanofiber, multi-layer carbon nanotubes and carbon black.

Carbon nanofiber is rigid carbon fiber having a relatively thick fiber diameter of 50 nm to 300 nm and a fiber length of about 10 μm. Such carbon nanofibers show weak entanglement between the fibers, and thus each of the carbon nanofibers can be easily dispersed by adding to a matrix and kneading. In addition, active substances can be easily connected to each other due to the very long carbon length of the carbon nanofiber. However, when trying to sufficiently construct electrically conductive networks by connecting the carbon nanofibers to each other, a large amount of the carbon nanofibers needs to be added.

On the other hand, carbon nanotubes have a thin fiber diameter of 5 nm to 40 nm and a fiber length of about 3 μm, showing an aspect ratio of several hundreds. Therefore, if they can be dispersed in a matrix, such an effect of improving the conductivity can be expected. However, the fibers of such carbon nanotubes are generally entangled each other to form aggregates of several hundred micrometers. When the aggregates of such strongly entangled carbon nanotubes is added to a matrix and kneaded, the aggregates only become finer, and the structure of the aggregates still remains. Therefore, it is difficult to achieve a state in which each of the carbon nanotubes is untangled. As a result, the carbon nanotubes sometimes have a little effect on imparting electric conductivity for its amount to be added.

Further, carbon blacks represent particles having a primary particle diameter of several nanometers to several tens of nanometers. The carbon blacks form a secondary structure called "STRUCTURE" in which primary particles are connected each other. The carbon black having a large specific surface area is excellent in a liquid retention property, and as a result, high input-output characteristics or an improvement effect can be expected. However, the STRUCTURE in this carbon black usually has a connection length of several hundreds of nanometers at most, and therefore the carbon black does not have a satisfactory cycle life property.

In order to compensate for the disadvantages and to utilize the advantages of each of the carbon nanofibers, the carbon nanotubes and the carbon black, studies have been made on a combined use of these materials as a conductive assistant.

In Japanese Patent Publication No. 4835881 (US 2012/0171566 A1; Patent Literature 1), a synergetic effect to reduce electric resistance by using carbon nanofibers and carbon nanotubes, and carbon nanotubes and carbon black in combination has been confirmed. However, satisfactory effect in terms of battery properties at a low temperature has not been attained and therefore further improvement is required.

Japanese Patent Publication No. 5497220 (US 2014-272596 A1; Patent Literature 2) discloses a method as described below as a method for obtaining composite carbon fiber comprising multi-walled carbon nanotubes, graphitized carbon nanofibers and carbon black particles. First, the carbon materials are each added to pure water and mixed to obtain a mixed liquid. The mixed liquid is separated into the carbon materials and pure water when allowed to stand still for several minutes. This shows that no physical change has occurred to the carbon materials. Subsequently, the mixed liquid is introduced with pressure using a pump into a grinding nozzle of a high-pressure dispersing device to obtain paste or slurry. As the mixed liquid passes through the nozzle at ultrahigh speed, strong shear force is generated by turbulence. By the shear force and the cavitation effect, the multi-walled carbon nanotube aggregates are untangled and are homogenously compounded with the graphitized carbon nanofibers and the carbon black particles.

Next, the resulting paste or slurry is dried for powdering. Examples of drying method include spray drying, lyophilization, drum drying, flash drying, hot-air drying, vacuum drying and the like.

The thus-obtained composite carbon fiber has a special structure in which carbon fibers, multi-walled carbon nanotubes and carbon black particles are homogeneously dispersed. However, even if this method is employed, the aggregation activity of the multi-walled carbon nanotubes in dry condition is enhanced when the mass ratio of the multi-walled carbon nanotubes in the composite carbon fiber exceeds a certain value, and it becomes difficult to redisperse the multi-walled carbon nanotubes when they are added to the matrix.

When multi-walled carbon nanotubes and graphitized carbon nanofibers are compared in terms of the aggregation activity, multi-walled carbon nanotubes having a smaller carbon diameter and a higher aspect ratio generally exhibit higher aggregation activity. In addition, in the case of the multi-walled carbon nanotubes produced by a supported catalyst method, they are entangled to each other like fuzzballs and more energy is required to untangle them and to produce a dispersion containing no aggregates. Therefore, in the case of performing a dispersing operation by adding multi-walled carbon nanotubes and graphitized carbon nanofibers to a solvent at the same time, excessive fracture of graphitized carbon nanofibers occurs under the condition suitable for the dispersion of multi-walled carbon nanotubes. In contrast, multi-walled carbon nanotubes will not be sufficiently dispersed under the condition suitable for the dispersion of graphitized carbon nanofibers.

PRIOR ART

Patent Literature 1: Japan Patent No. 4835881 (US 2012/171566 A1)
Patent Literature 2: Japan Patent No. 5497220 (US 2014/272596 A1)

SUMMARY OF INVENTION

Problem to be Solved by Invention

An object of the present invention is to provide an electrically conductive paste having an excellent effect to improve a low-temperature property, which is easily dispersed in an electrode for a secondary battery and the like without leaving aggregates of electrically conductive materials.

Means to Solve Problem

The present inventors have made intensive studies to achieve the above-described object, and as a result, have accomplished the present invention including the embodiments as below.

1. A method for producing an electrically conductive paste, comprising a step of manufacturing a paste A by exerting a cavitation effect on a mixed liquid A containing multi-walled carbon nanotubes and a solvent, a step of manufacturing a paste B from a mixed liquid B containing carbon black particles, graphitized carbon nanofibers and a solvent, and a step of mixing the paste A and the paste B.
2. The method for producing an electrically conductive paste as described in 1 above, comprising a method of adding a dispersing agent to the mixed liquid A and/or the mixed liquid B.
3. The method for producing an electrically conductive paste as described in 1 or 2 above, further comprising a method of applying shear force to the mixed liquid A.
4. The method for producing an electrically conductive paste as described in 3 above, in which the method of exerting a cavitation effect on and applying shear force to the mixed liquid A is a method of allowing the mixed liquid A to pass through a nozzle at a pressure within a range of 100 MPa or more and less than 250 MPa.
5. An electrically conductive paste, in which multi-walled carbon nanotubes, carbon black particles and graphitized carbon nanofibers are dispersed in a solvent, and the ratio by mass of the carbon black particles to the multi-walled carbon nanotubes (mass of the carbon black particles/mass of multi-walled carbon nanotubes) is 0.1 to 0.4, and the content of the graphitized carbon nanofibers in the total mass of the multi-walled carbon nanotubes, the carbon black particles and the graphitized carbon nanofibers is 10 to 40 mass %, and the paste does not substantially comprise multi-walled carbon nanotube aggregates having an aggregate size of 1 μm or more.
6. The electrically conductive paste as described in 5 above, which further comprises a dispersing agent.
7. The electrically conductive paste as described in 6 above, in which the dispersing agent is a non-ionic dispersing agent.
8. An electrode using a material obtained by drying the electrically conductive paste described in any one of 5 to 7 above as a conductive assistant.
9. A secondary battery comprising the electrode described in 8 above.
10. A capacitor comprising the electrode described in 8 above.

Effect of Invention

In the electrically conductive paste in an embodiment of the present invention, the electrically conductive materials constituting the paste are dispersed in a solvent without being aggregated. When the electrically conductive paste of the present invention is added to an electrode for a secondary battery and the like as a conductive assistant, the electrically conductive materials can be easily dispersed without being aggregated and the charge characteristics and the cycle characteristics at a low temperature are to be improved.

BRIEF DESCRIPTION OF DRAWINGS

FIG. 1 An image of the multi-walled carbon nanotubes obtained in Manufacturing Example 2 taken by a transmission electron microscope FIG. 2 An image of the aggregates of the multi-walled carbon nanotubes obtained in Manufacturing Example 2 taken by a scanning electron microscope FIG. 3 is for showing a fiber diameter distribution of the multi-walled carbon nanotubes obtained in Manufacturing Example 2.

FIG. 4 An image of the graphitized carbon nanofibers obtained in Manufacturing Example 2 taken by a scanning electron microscope FIG. 5 is for showing a fiber diameter distribution of the graphitized carbon nanofibers obtained in Manufacturing Example 6.

FIG. 6 is for showing the results of the thermal analysis of the pulverized product of the multi-walled carbon nanotubes obtained in Manufacturing Example 3, the carbon nanofibers after calcination which was obtained in Manufacturing Example 5, and the graphitized carbon nanofibers obtained in Manufacturing Example 6.

FIG. 7 An image of the dried mixed liquid of the multi-walled carbon nanotubes obtained in Manufacturing Example 8 taken by a scanning electron microscope FIG. 8 An image of the dried paste of the multi-walled carbon nanotubes after the dispersion treatment obtained in Manufacturing Example 8 taken by a scanning electron microscope FIG. 9 An image of the dried mixed liquid of the graphitized carbon nanofibers and Ketjenblack obtained in Manufacturing Example 9 taken by a scanning electron microscope FIG. 10 An image of the dried paste of the graphitized carbon nanofibers and Ketjenblack after the dispersion treatment obtained in Manufacturing Example 9 taken by a scanning electron microscope FIG. 11 An image of the dried electrically conductive paste obtained in Example 1 taken by a scanning electron microscope FIG. 12 is for showing the jigs used in Examples for the measurement of the compressed specific resistance.

MODE FOR CARRYING OUT INVENTION

The electrically conductive paste in an embodiment of the present invention comprises multi-walled carbon nanotubes, carbon black particles and graphitized carbon nanofibers. The materials, the size and the like exemplified in the explanation described below are merely an example and the present invention shall not be construed as limited thereto. It is possible to carry out the invention by changing the materials, the size and the like within a scope which does not change the gist of the invention.

[Multi-Walled Carbon Nanotubes]

For the multi-walled carbon nanotubes used for the present invention, 99% by number or more of the multi-walled carbon nanotubes have a fiber diameter of 5 to 40 nm, preferably 7 to 20 nm, more preferably 9 to 15 nm. Multi-walled carbon nanotubes having a small fiber diameter are difficult to be dispersed in a state where each of them is untangled. Multi-walled carbon nanotubes having a large fiber diameter are difficult to be manufactured by the supported catalyst method.

The multi-walled carbon nanotubes used for the present invention may have a tubular structure in which graphene sheets comprising carbon six membered rings are rolled in parallel to the fiber axis, a platelet structure in which graphene sheets are perpendicularly arranged to the fiber axis or a herringbone structure in which graphene sheets are rolled with an oblique angle to the fiber axis. Among these, the multi-walled carbon nanotubes with a tubular structure are preferred in view of electric conductivity and mechanical strength.

The fiber length of the multi-walled carbon nanotubes used in the present invention is not particularly limited, and is preferably 0.5 to 100 μm, more preferably 1.0 to 10 μm, still more preferably 1.5 to 5 μm. When the fiber length is too short, the nanotubes have little effect of imparting conductivity. When the fiber length is too long, the nanotubes tend to be poor in the dispersibility in the electrically conductive paste.

The aspect ratio of the multi-walled carbon nanotubes as a raw material is preferably 100 to 1,000, more preferably 400 to 1,000. Although the multi-walled carbon nanotubes having a small aspect ratio can be easily dispersed, it tends to be difficult to form long-distance electrically conductive networks. On the other hand, the multi-walled carbon nanotubes having a large aspect ratio, in which the degree of entanglement between fibers becomes strong, tend to be hardly dispersed.

Further, the aspect ratio of the multi-walled carbon nanotubes in the electrically conductive paste is preferably 100 or more, more preferably 200 or more, even more preferably 400 or more. Note that the upper limit of the aspect ratio of the multi-walled carbon nanotubes is not particularly limited, but is preferably 1000 or less in view of dispersion efficiency. The BET specific surface area of the multi-walled carbon nanotubes is preferably 150 to 300 $m^2/g$, more preferably 200 to 280 $m^2/g$, still more preferably 250 to 270 $m^2/g$.

The $C_0$ value as being the interplanar distance between the lattice planes of the multi-walled carbon nanotubes is preferably 0.680 to 0.690 nm. When the $C_0$ value of the multi-walled carbon nanotubes is small, aggregates tend to be hardly untangled.

The oxidation starting temperature of the multi-walled carbon nanotubes as a raw material is preferably 400 to 550° C. In this context, the oxidation starting temperature is a temperature at which the weight is decreased by 0.1% relative to the initial weight (the prepared amount) when heated to 1000° C. at 10° C./minute under air flow in a thermobalance. The lower the oxidation starting temperature is, the more defects tend to be contained in carbon crystals.

The multi-walled carbon nanotubes as a raw material have a compressed specific resistance of preferably 0.014 to 0.020 Ωcm at the compressed density of 0.8 $g/cm^3$. While multi-walled carbon nanotubes with a small compressed specific resistance tend to have high flexibility, multi-walled carbon nanotubes with a large compressed specific resistance tend to have a low electric conductivity imparting effect.

The multi-walled carbon nanotubes used for the present invention are not particularly limited by synthesis methods thereof, but are preferably synthesized by a gas phase methods. Among the gas phase methods, those synthesized by a supported catalyst method is preferred. The supported catalyst method is a method in which carbon fibers are manufactured by allowing a carbon source to react in a gas phase using a catalyst where catalyst metals are supported on inorganic supports.

Examples of the inorganic supports used in the supported catalyst method include alumina, magnesia, silica titania, calcium carbonate and the like. The inorganic supports are preferably in a form of powdered granular. Examples of the catalyst metals include iron, cobalt, nickel, molybdenum, vanadium and the like. Supporting can be performed by impregnating supports in a solution of a compound comprising a catalyst metal element, by performing co-precipitation of a solution of a compound comprising a catalyst metal element and a compound comprising an element which constitutes an inorganic support, or by other known methods of supporting.

Examples of the carbon sources to be reacted in a gas phase include methane, ethylene, acetylene and the like. The reaction can be performed in a reaction vessel such as fluid bed, moving bed and fixed bed. A temperature during the reaction is preferably set at 500 to 800° C. Carrier gas can be used in order to supply a carbon source to a reaction vessel. Examples of the carrier gas include hydrogen, nitrogen, argon and the like. A reaction time is preferably for 5 to 120 minutes.

[Carbon Black Particles]

The carbon black particles used in the present invention has a primary particle diameter of preferably 20 to 100 nm, more preferably 30 to 80 nm, even more preferably 30 to 50 nm. The secondary particle diameter (particle diameter of the structure) is generally 30 to 500 nm, preferably 30 to 100 nm. By setting the secondary particle diameter within a range of 30 to 500 nm, the structure formed by the carbon black particles exerts even higher conductivity. Examples of the materials include carbon black-based electrically conductive particles such as acetylene black, furnace black and Ketjenblack.

[Graphitized Carbon Nanofibers]

For the graphitized carbon nanofibers used for the present invention, 99% by number or more of the graphitized carbon nanofibers have a fiber diameter of 50 to 300 nm, preferably 75 to 250 nm, more preferably 100 to 200 nm. The graphitized carbon nanofibers with a small fiber diameter are easy to aggregate and hardly untangled and dispersed in a matrix such as resin because they usually have a high aspect ratio. On the other hand, the graphitized carbon nanofibers with a large fiber diameter usually have a small aspect ratio, and although they have excellent dispersibility in a matrix such as resin, networks in a matrix may be often difficult to be efficiently formed. The fiber length of the graphitized carbon nanofiber is generally 1 to 100 μm, and the one having a fiber length of 1 to 30 μm is suitable to the improvement of electrical conductivity.

The BET specific surface area of the graphitized carbon nanofibers is preferably 6 to 40 $m^2/g$, more preferably 8 to 25 $m^2/g$, even more preferably 10 to 20 $m^2/g$.

The $C_0$ value as being the interplanar distance between the lattice planes of the graphitized carbon nanofibers is preferably 0.676 to 0.680 nm. When the $C_0$ value is larger than 0.680 nm, electric conductivity tends to be decreased.

The oxidation starting temperature of the graphitized carbon nanofibers is preferably 600 to 700° C. For the graphitized carbon nanofibers having an oxidation starting temperature of less than 600° C., graphite crystals may not be fully developed.

The graphitized carbon nanofibers have a compressed specific resistance of 0.006 to 0.017 Ωcm at the compressed density of 0.8 $g/cm^3$. It is difficult to achieve a compressed specific resistance of less than 0.006 Ωcm. On the other hand, when a compressed specific resistance is larger than 0.017 Ωcm, it reduces an electric conductivity imparting effect.

The graphitized carbon nanofibers used in the present invention are not particularly limited by synthesis methods thereof, but are preferably manufactured by the synthesis of carbon nanofibers by gas phase methods and the graphitization of the synthesized carbon nanofibers. Among the gas phase methods, the carbon nanofibers synthesized by the floating catalyst method are preferred. The graphitization of carbon nanofibers is preferably performed by the method comprising heat-treating the carbon nanofibers synthesized by a gas phase method at 2000° C. or higher under an inert atmosphere.

The floating catalyst method is a method in which carbon fibers are obtained by introducing a raw material liquid or a gasification product thereof where ferrocene and a sulfur compound as a catalyst source are dissolved in benzene as a carbon source into a flow reactor furnace heated at 1000° C. or higher using carrier gas such as hydrogen. Generally, a hollow tube is formed starting from the catalyst metal in the initial stage of the reaction, and an approximate length of the carbon fiber is determined. Subsequently, pyrolyzed carbon is deposited on the surface of the hollow tube, and the growth of the fiber in a radial direction progresses, forming a growth ring-like carbon structure. Therefore, the fiber diameter can be adjusted by controlling a deposited amount of the pyrolyzed carbon on the hollow tube during the reaction: i.e. a reaction time, a concentration of the raw material in the atmosphere and a reaction temperature. The carbon nanofibers obtained by this reaction may have low electric conductivity since they are covered with pyrolyzed carbon having low crystallinity. Accordingly, in order to increase the crystallinity of the carbon fibers, heat treatment is performed at 800 to 1500° C. under an inert gas atmosphere and the like, and then graphitization treatment is performed at 2000 to 3000° C. The graphitization treatment allows evaporative removal of the catalyst metal to make the carbon nanofibers highly pure. It is desirable to conduct the graphitization treatment in an atmosphere where the carbon materials are difficult to oxidize. For example, a method of conducting heat treatment in an inert gas atmosphere such as nitrogen and a method of providing a layer serving as a barrier to oxygen to the surface in contact with air may be employed. As a barrier layer, it is possible to employ a method of providing a carbon plate and a carbon powder layer separately to consume oxygen.

[Method for Producing Electrically Conductive Paste]

The method for producing the electrically conductive paste of the present invention is not particularly limited as long as it comprises a step of manufacturing a paste A from a mixed liquid A containing multi-walled carbon nanotubes, a solvent, and a dispersing agent which may be used as needed; a step of manufacturing a paste B from a mixed liquid B containing graphitized carbon nanofibers, a solvent, and a dispersing agent which may be used as needed; and a step of mixing the paste A and the paste B. It is desirable to produce the electrically conductive paste as described below.

(1) A paste of multi-walled carbon nanotubes which does not eventually contain multi-walled carbon nanotube aggregates having an aggregate size of 1 μm or more (paste A) is produced.

(2) A mixed paste of graphitized carbon nanofibers and carbon black particles which does not eventually contain graphitized carbon nanofiber aggregates having an aggregate size of 10 μm or more (paste B) is produced.

(3) The paste A and the paste B are mixed.

In the production of the electrically conductive paste of the present invention, it is desirable to minimize the fractures of multi-walled carbon nanotubes and graphitized carbon nanofibers. In the case of using an electrically conductive in which multi-walled carbon nanotubes and graphitized carbon nanofibers are fractured excessively as a conductive agent in a secondary battery, good characteristics in terms of the charge characteristics and the cycle characteristics cannot be attained.

Multi-walled carbon nanotubes are extremely easy to aggregate. Hence, in the present invention, they are dispersed by exerting a cavitation effect in the mixed liquid A so as to prevent aggregates. As a method for dispersing carbon nanotubes, a bead mill, a dispersing device with a rotor/stator, a high-pressure dispersing device and the like may be employed, and among these, preferred is a high-pressure dispersing device. Examples of high-pressure dispersing devices include Nanovater provided from Yoshida Kikai Co., Ltd., Nanomaker provided from Advanced Nano Technology Co., Ltd.

Cavitation is a phenomenon that happens when the pressure in the liquid stream becomes lower than the saturated vapor pressure only for a short period of time, in which a number of bubbles are generated due to a boil of the liquid or the release of a dissolved gas, by using minuscule bubble nuclei existing in the liquid as a nucleus. When the surrounding pressure becomes higher than the saturated vapor pressure after the occurrence of the cavitation, the surrounding liquid makes a rush to the center of bubbles and at the moment when the bubbles disappear, very strong pressure waves are generated due to the collision in the center.

When the mixed liquid containing multi-walled carbon nanotubes (mixed liquid A) is subjected to high-pressure dispersion treatment, it causes a rapid expansion due to the generation of bubbles, and pressure waves due to disappearance of bubbles, in aggregates of the multi-walled carbon nanotubes by a cavitation effect. The aggregates are untangled due to the pressure waves and the multi-walled carbon nanotubes are dispersed.

The pressure to give the cavitation effect is preferably 100 MPa or more and less than 245 MPa, more preferably 100 MPa or more and less than 200 MPa. When the pressure to give the cavitation effect is too high, the viscosity of mixed liquid A tends to increase.

Examples of the method for giving the cavitation effect include a method by ultrasonic irradiation under a high pressure, a method of introducing the mixed liquid A into a nozzle with a high pressure to allow the liquid to pass through, a method of spraying the mixed liquid A in a liquid at a ultrahigh pressure and the like. Among these, a method of introducing the mixed liquid A into a nozzle with a high pressure to allow the liquid to pass through or a method of spraying the mixed liquid A in a liquid at a ultrahigh pressure is preferable because it can impart a cavitation effect at a high density and a strong shear force to mixed liquid A.

Examples of the nozzle used in a method of introducing mixed liquid A into a nozzle with a high pressure to allow the liquid to pass through include a cross nozzle and a straight nozzle. A straight nozzle is preferable in the present invention. A straight nozzle is a nozzle having a linear flow channel. In a nozzle, a slit, a through hole, a crossed flow channel, a bent flow channel and a branched flow channel are provided. When the mixed liquid A passes the nozzle, collisions against a wall, collisions of the mixed liquid A with each other, occurrence of turbulences, and compression, expansion and shear of the liquid are caused other than the cavitation. A pressure at the time when the mixed liquid A passes through the nozzle is preferably 100 MPa or more and less than 245 MPa, more preferably 100 MPa or more and less than 200 MPa. The mixed liquid A which passed through the nozzle may be allowed to go through the nozzle again. The number of times that the mixed liquid A passes through the nozzle is preferably 1 to 5 times, more preferably 1 to 3 times. When the mixed liquid A passes through the nozzle more than 5 times, it may cause fiber fragmentation and re-aggregation of the multi-walled carbon nanotubes in some cases.

In the method of spraying the mixed liquid A in a liquid at a ultrahigh pressure, a jet nozzle is used. When the mixed liquid A is sprayed in a liquid by a jet nozzle, cavitation is caused around the area in which the mixed liquid A is jet-sprayed. The pressure at the time of spraying the mixed liquid A is preferably 100 MPa or more and less than 245 MPa, more preferably 100 MPa or more and less than 200 MPa. The mixed liquid A which was sprayed in a liquid may be again sprayed in a liquid. The number of repetitions of spraying into a liquid is preferably 1 to 5, more preferably 1 to 3. When the number of repetitions exceeds 5, it may cause fiber fragmentation and re-aggregation of the multi-walled carbon nanotubes in some cases.

The paste of multi-walled carbon nanotubes (paste A) in (1) can be obtained by, for example, a method as described below. The mixed liquid A is obtained by adding multi-wall carbon nanotubes to a solvent. In this case, it is preferable to use the multi-walled carbon nanotubes which were preliminarily subjected to pulverizing treatment by a dry method, to thereby make the multi-walled carbon nanotube aggregates have a size equal to or smaller than a diameter of the nozzle of the high-pressure dispersing device. If the pulverizing treatment is not conducted, the aggregates may block the nozzle of the high-pressure dispersing device in some cases.

Subsequently, the mixed liquid A is introduced to a high-pressure dispersing device by using a slurry pump, and after pressurized in the device, the mixed liquid A is sprayed from the nozzle to obtain the paste of multi-walled carbon nanotubes (paste A). As the mixed liquid passes through the nozzle at an ultrahigh speed, strong shear force is generated by turbulence, and this shear force and the cavitation effect untangle the multi-walled carbon nanotube aggregates.

On the other hand, a bead mill, a dispersing device with a rotor/stator, a high-pressure dispersing device and the like are used for dispersing the graphitized carbon nanofibers and the carbon black particles.

The mixed paste of graphitized carbon nanofibers and carbon black particles (paste B) in (2) can be obtained by, for example, a method as described below. Mixed liquid B is obtained by adding graphitized carbon nanofibers and carbon black particles to a solvent. Subsequently, the mixed liquid B is allowed to pass through a dispersing device with a rotor/stator to obtain the mixed paste of graphitized carbon nanofibers and carbon black particles (paste B). Or, paste B may be obtained by separately producing a graphitized carbon nanofiber paste and a carbon black particle paste and by mixing these pastes.

In the mixing of the paste of multi-walled carbon nanotubes and the mixed paste of graphitized carbon nanofibers and carbon black particles in (3), the pastes may be mixed by a stirring device having a stirring shaft provided with stirring blades. A dispersing device with a rotor/stator or a high-pressure dispersing device may also be used.

The solvent of the electrically conductive paste of the present invention is not particularly limited, and examples of the solvent include N-methylpyrrolidone and water for use in a lithium ion battery. It is preferable to use the same kind of solvent in the paste A and the paste B. A dispersing agent may be added to the electrically conductive paste of the present invention within a scope which does not affect the function of the paste. A dispersing agent may be used at the time of producing the paste A and the paste B, respectively. A dispersing agent is not particularly limited, and a known dispersing agent among ionic dispersing agents and non-ionic dispersing agent can be used. In the case of using a dispersing agent, it may be added in any order. For example, there is a method of dissolving the total amount of the dispersing agent in a solvent in advance and adding the carbon material such as multi-walled carbon nanotubes thereto to obtain a mixed liquid.

Examples of an ionic dispersing agent include anionic dispersing agents made from alkylsulfonic acid, polycarboxylic acid, and polycarboxylic acid partially containing alkyl ester; and cationic dispersing agents made from quaternary ammonium, alkylpolyamine, and polyalkylene polyamine.

Examples of a non-ionic dispersing agent include polyvinylpyrrolidone, polyvinylbutyral, polyvinylidene fluoride, polytetrafluoroethylene, polyhexafluoropropylene, polyvinyl alcohol, polyvinyl acetal, polyvinyl ether, polyether, polyalcohol ester, and cellulose derivatives. Among these, polyvinylpyrrolidone is particularly preferable.

The electrically conducive paste of the present invention does not substantially comprise multi-walled carbon nanotube aggregates having an aggregate size of 1 µm or more. Furthermore, it is preferable that the paste does not substantially comprise graphitized carbon nanofiber aggregates having an aggregate size of 10 µm or more. Here, the term "aggregate size" means a diameter of an aggregate which is formed by aggregation of multiple primary particles.

The phrase "does not substantially comprise multi-walled carbon nanotube aggregates having an aggregate size of 1 µm or more" means that when the electrically conductive paste is applied onto a metal foil and dried, and the resultant is observed at 10 fields (the area of one field: 70 µm×70 µm) under a scanning electron microscope at a magnification of 2,000, ten or more multi-walled carbon nanotube aggregates having an aggregate size of 1 µm or more are observed only in one field or less.

The phrase "does not substantially comprise graphitized carbon nanofiber aggregates having an aggregate size of 10 µm or more" means that when the electrically conductive paste is applied onto a metal foil and dried, and the resultant is observed at 10 fields (the area of one field: 70 µm×70 µm) under a scanning electron microscope at a magnification of 2,000, ten or more graphitized carbon nanofiber aggregates having an aggregate size of 10 µm or more are observed only in one field or less.

The content of the graphitized carbon nanofiber in the three kinds of carbon materials contained in the electrically conductive paste is 10 to 40 mass %. It is preferably 15 to 30 mass %, and more preferably 20 to 30 mass %. When the content of graphitized carbon nanofiber is less than 10 mass %, it becomes difficult to establish long-distance conductive paths by the graphitized carbon nanofibers, while when the content exceeds 40 mass %, it may lead to a shortage of short-distance conductive paths since the number of carbon black particles and the number of multi-walled carbon nanotubes that exist in the electrode are relatively reduced.

The ratio by mass of the mass of the carbon black particles and the mass of the multi-walled carbon nanotubes (mass of the carbon black particles/mass of multi-walled carbon nanotubes) is 0.1 to 4.0. The ratio is preferably 0.2 to 3.0, more preferably 0.3 to 1.5. When the ratio by mass of the carbon black particles and the mass of the multi-walled carbon nanotubes is less than 0.1, the resistance to diffusion of lithium ions may increase. When the ratio by mass of the carbon black particles and the mass of the multi-walled carbon nanotubes exceeds 4.0, the cycle characteristics may deteriorate.

Generally, a dispersed state can be attained by mixing multi-walled carbon nanotubes and a solvent, and applying a strong shear force. However, re-aggregation of the multi-walled carbon nanotubes is caused by leaving the dispersion liquid to stand still for a long period of time. Since the electrically conductive paste in one embodiment of the present invention contains carbon black particles and graphitized carbon nanofiber other than multi-walled carbon nanotubes, these materials form a network having a three-dimensional interpenetrating structure in the paste to thereby prevent re-aggregation of multi-walled carbon nanotubes. That is, the multi-walled carbon nanotubes, the carbon black particles and the graphitized carbon nanofiber have an effect as a dispersion stabilizer that suppresses aggregation or sedimentation of each of them.

The electrically conductive paste according to one embodiment in the present invention has a function as a conductive assistant. Therefore, they can be suitably used for a positive electrode and/or a negative electrode for a battery. For example, a positive electrode for a battery comprises a positive electrode active material, a conductive assistant and a binder. For example, a negative electrode for a battery comprises a negative electrode active material, a conductive assistant and a binder.

With regard to the positive electrode active material, any one or more of the conventional materials known as a positive electrode active material for a lithium based battery (materials capable of occluding and releasing lithium ions) may be appropriately selected for use. Among these, lithium-containing metal oxides capable of occluding and releasing lithium ions are suitable. The lithium-containing metal oxides can include composite oxides comprising elemental lithium and at least one element selected from Co, Mg, Cr, Mn, Ni, Fe, Al, Mo, V, W, Ti and the like.

With regard to the negative electrode active material, any one or more of the conventional materials known as a negative electrode active material for a lithium based battery (materials capable of occluding and releasing lithium ions) may be appropriately selected for use. For example, materials capable of occluding and releasing lithium ions can include any of carbon materials, Si and Sn, or alloys and oxides comprising at least one of these. Representative examples of the carbon materials include natural graphite; artificial graphite produced by heat-treating petroleum-based coke and coal-based coke; hard carbon manufactured by carbonizing resin; mesophase pitch-based carbon materials; and the like. In the case of natural graphite or artificial graphite, preferred are those having an interplanar spacing $d_{002}$ of 0.335 to 0.337 nm.

The binder can be suitably selected for use from the conventional materials known as a binder for an electrode of a lithium based battery. Such binders can include, for example, fluorine-containing high molecular weight polymers such as poly(vinylidene fluoride), vinylidene fluoride-hexafluoropropylene copolymer, vinylidene fluoride-chlorotrifluoroethylene copolymer and vinylidene fluoride-tetrafluoroethylene copolymer; styrene-butadiene copolymerized rubber (SBR); acrylic rubber; and the like.

The details of embodiments of the present invention were described above, but the present invention shall not be construed as limited to specific embodiments and a variety of changes/modifications are available within a scope of the gist of the present invention described in the scope of claims.

EXAMPLES

Examples of the present invention will be described below to illustrate the present invention in more detail. Note that these are shown for merely illustrative purposes. The present invention shall not be construed as limited thereto in any way.

[Fiber Diameter of the Carbon Nanofibers]

More than 100 fiber filaments were measured for the diameter at a magnification of 20,000 times under the scanning electron microscope, and the fiber diameter distribution and a number-average fiber diameter were calculated from the measurement results.

[Fiber Length of the Carbon Nanofibers]

The fibers were panoptically photographed at a magnification of 10,000 times or higher under the scanning electron microscope, and a field was prepared in which the both ends of a fiber can be measured. Length was measured for 100 fibers or more, which were averaged to give the fiber length.

[Transmission Electron Microscope Observation]

A sample of powder in a small amount was transferred in ethanol, and dispersed by ultrasonic irradiation, which was held at a carbon micro grid (with a supporting membrane). This was used as an observation sample, and observed with Hitachi 9500.

[Fiber Diameter of the Multi-Walled Carbon Nanotubes]

A fiber diameter was measured for 100 fibers or more at a magnification of 100 k times under the transmission electron microscope. The fiber diameter distribution and the number-average fiber diameter were evaluated from them.

[Fiber Length of the Multi-Walled Carbon Nanotubes]

The fibers were panoptically photographed at a magnification of 100,000 times or higher under the transmission electron microscope, and a field was prepared in which the both ends of a fiber can be measured. Length was measured for 50 fibers or more, which were averaged to give the fiber length.

[Compressed Specific Resistance, Load-Compressed Density Curve]

A measurement jig shown in FIG. 12 was used. Cell 4, which is made of resin and has an inside dimension of 4 cm in width×1 cm in depth×10 cm in height, is provided with Current terminal 3 of a copper plate for applying current to Measured object 5 and Voltage measurement terminal 1 in the middle. A fixed amount of a sample is placed in Cell 4, and then force is applied to Compression rod 2 from above to compress the sample. Current of 0.1 A was allowed to flow through the sample, and when a bulk density was 0.8 g/cm$^3$, a value of the voltage between two Voltage measurement terminals 1 inserted from the bottom of the container and separated by 2.0 cm was read to calculate specific resistance R from the following formula.

$$R=(\text{voltage/current})\times(\text{cross section/distance between terminals})=(E/0.1)\times(D/2)$$

wherein, cross section D in the current direction=height× depth of the compressed body=d×1 [cm$^2$], and E is the voltage between the terminals [V].

The specific resistance varies depending on pressurizing conditions. The specific resistance is high under low pressure while it becomes lower as pressure increases. Above a certain pressure value, it shows an almost constant value. In this Example, the specific resistance when compressed to a bulk density of 0.8 g/cm$^3$ is designated as a compressed specific resistance.

[Specific Surface Area]

An amount of nitrogen gas adsorbed under the liquid nitrogen temperature (77 K) was measured using NOVA 1000 manufactured by Yuasa Ionics to compute a specific surface area by the BET method.

[Lattice Constant $C_0$]

Using a multipurpose X-ray diffractometer with a horizontally arranged sample (Ultima IV, Rigaku Corporation), measurements were performed using silicon powder as an internal standard in accordance with the Gakushin method ("Latest Carbon Material Experiment Techniques (Measurement/Analysis)", edited by Carbon Society of Japan).

[Thermal Analysis]

EXSTAR 6000 TG/DTA manufactured by SII Nanotechnology was used for the thermal analysis. On a platinum pan, 10 mg of a sample was loaded. Measurement conditions for the thermal analysis were as follows: heating to 1000° C. at 10° C./min under air flow of 100 ml/min.

[Particle Size]

To a beaker containing 20 ml of pure water, 0.007 g of a sample was weighed and added, to which 0.2 g of a non-ionic surfactant (diluted Triton; diluted 100 times with pure water; manufactured by Roche Applied Science) was added dropwise. The beaker was treated with an ultrasonic dispersing device for 5 minutes. Then, 30 ml of pure water was added to the beaker, and then again treated with the ultrasonic dispersing device for 3 minutes. The particle size of the sample in the dispersion liquid was measured with Nikkiso micro track HRA.

Manufacturing Example 1: Preparation of a Catalyst for the Synthesis of Multi-Walled Carbon Nanotubes To prepare a support, aluminium hydroxide (Showa Denko K.K., HIGILITE (registered trademark) M-43) was heat-treated at 850° C. for 2 hours under the atmosphere in which air was flowing.

To a 300 ml tall beaker, 50 g of pure water were added, and then 4.0 g of the aluminum hydroxide support were added and dispersed to prepare support slurry.

To a 50 ml beaker, 16.6 g of pure water were added and then 0.32 g of hexaammonium heptamolybdate tetrahydrate (Junsei Chemical Co., Ltd.) was added and dissolved. Subsequently, 7.23 g of iron (III) nitrate nonahydrate (Kanto Chemical Co., Inc.) were added and dissolved to prepare a catalyst solution.

Further, to another 50 ml beaker, 32.7 g of pure water were added, and then 8.2 g of ammonium carbonate (Kanto Chemical Co., Inc.) were added and dissolved to prepare a pH adjustment solution.

A stirring element was placed in the tall beaker containing the support slurry, and stirred on a magnetic stirrer. Each of the catalyst solution and the pH adjustment solution was added dropwise to the support slurry with a Pasteur pipette while monitoring a pH meter to maintain a pH value of the slurry at 6.0±0.1. It took 15 minutes before all of the catalyst solution was added to the support slurry. The content in the tall beaker was separated on a filter paper (5C), and 50 g of pure water was sprinkled over the cake on the filter paper for washing. The washed cake was transferred to a porcelain dish, and dried in a 120° C. hot air oven for 6 hours. The resulting dried material was pulverized on a mortar to obtain a catalyst for synthesizing the multi-walled carbon nanotubes.

Manufacturing Example 2: Synthesis of Multi-Walled Carbon Nanotubes (MWCNT)

On a quartz boat, placed was 1.0 g of the catalysts obtained in Manufacturing Example 1. This was placed at the center of a horizontal tubular furnace (a quartz tube: inner diameter: 50 mm, length: 1500 mm, soaking zone: 600 mm). The horizontal tubular furnace was heated to 680° C. in 30 minutes with nitrogen gas supplied thereto at a flow rate of 500 ml/min. Then, the nitrogen gas supply was stopped, and a mixed gas of ethylene and hydrogen (the concentration of ethylene: 50% by volume) was then supplied at a flow rate of 2,000 ml/min, and allowed to react for 20 minutes to synthesize multi-walled carbon nanotubes. The mixed gas supply was stopped, and then nitrogen gas was supplied. After cooled down to room temperature, the synthesized multi-walled carbon nanotubes were taken out from the furnace.

Fiber dimensions and powder properties are shown in Table 1. A transmission electron microscope image is shown in FIG. 1, a scanning electron microscope image of aggregates is shown in FIG. 2 and the fiber diameter distribution is shown in FIG. 3.

Manufacturing Example 3: Pulverization of the Multi-Walled Carbon Nanotubes (Pulverized MWCNT)

The multi-walled carbon nanotubes synthesized in Manufacturing Example 2 were fed to a jet mill STJ-200 manufactured by Seishin Enterprise Co., Ltd. at 6 kg/h for pulverization under the conditions of a pusher nozzle pressure of 0.64 MPa and a grinding nozzle pressure of 0.60 MPa. The 50% particle diameter $D_{50}$ in a volume based accumulative particle size distribution of the aggregates was 10 μm. Then, a non-fibrous product was separated by air classification.

Fiber dimensions and powder properties are shown in Table 1. The results from thermal analysis are shown in FIG. 6.

Manufacturing Example 4: Synthesis of the Carbon Nanofibers

A reactor comprising a reaction tube with an inner diameter of 370 mm and a length of 2000 mm and a heater was prepared. Two fluid mixing nozzles for supplying a raw material were provided at the upper part of the reaction tube, and a conveyor was arranged at the lower part of the reaction tube, which was connected to a tank with a bag filter installed. Inflammable gas passed through the bag filter was burned in an incinerator.

In order to prepare a raw material liquid (3.5% by mass of ferrocene and 0.08% by mass of sulfur in the raw material liquid), 0.49 kg of ferrocene and 0.01 kg of sulfur were dissolved in 13.5 kg of benzene. The raw material liquid prepared and hydrogen were fed at a flow rate of 360 g/min and 700 NL/min, respectively. The raw material liquid was sprayed into the reaction tube through the two fluid nozzles and allowed to pass through the reaction tube heated at 1,300° C. to synthesize carbon fibers. After feeding the raw material for 2 hours, the supply of the raw material liquid and hydrogen was stopped, and nitrogen was then supplied to expel inflammable gas.

Manufacturing Example 5: Calcination of the Carbon Nanofibers (Calcined CNF)

A graphite crucible (outer diameter: 100 mm, inner diameter: 85 mm, length: 200 mm) was filled with 80 g of the carbon nanofibers obtained in Manufacturing Example 4, and placed in a calcination furnace (inner diameter: 120 mm). It was heated to 1,200° C. in 4 hours under argon atmosphere, and the temperature was maintained for 1 hour to remove a tar component adhered to the carbon nanofibers. After calcination, the calcined carbon nanofibers recovered from the graphite crucible were crushed for 1 minute with a juicer mixer (fiber mixer MX-X57 manufactured by Panasonic Corporation).

Fiber dimensions and powder properties are shown in Table 1. The results from thermal analysis are shown in FIG. 6.

Manufacturing Example 6: Graphitization of the Carbon Nanofibers (Graphitized CNF)

A graphite crucible was filled with the calcined carbon nanofibers obtained in Manufacturing Example 5, and placed in a high-frequency heating furnace (inner diameter: 120 mm). It was heated to 2,800° C. in 4 hours under argon atmosphere, and the temperature was maintained for 1 hour to graphitize the carbon nanofibers. After the graphitization treatment, the graphitized carbon nanofibers recovered from the graphite crucible were pulverized with a stream mill KV-3 lab unit manufactured by Yakushin Kikai Seisakusyo at a rotating speed of 5,000 rpm.

Fiber dimensions and powder properties are shown in Table 1. A scanning electron microscope image is shown in FIG. 4, the fiber diameter distribution is shown in FIG. 5, and the results from thermal analysis are shown in FIG. 6.

TABLE 1

| | Manufacturing Examples | | | |
|---|---|---|---|---|
| | 2 MWCNT | 3 Pulverized MWCNT | 5 Calcined CNF (carbon nanofiber) | 6 Graphitized CNF (carbon nanofiber) |
| Fiber diameter (nm) | 10 | 10 | 180 | 180 |
| Fiber length (μm) | 4.5 | 4.0 | 7.5 | 7.2 |
| Aspect ratio | 450 | 400 | 42 | 40 |
| Compressed specific resistance (Ω cm) | 0.0162 | 0.0178 | 0.0424 | 0.0151 |
| BET specific surface area (m$^2$/g) | 260 | 260 | 14 | 13 |
| $C_0$ (nm) | 0.683 | 0.683 | 0.693 | 0.677 |
| Oxidation starting temperature (° C.) | 460 | 460 | 510 | 660 |

Manufacturing Example 7: Composite Powder Comprising Multi-Walled Carbon Nanotubes, Carbon Black Particles and Graphitized Carbon Nanofiber

[Preparation of Mixed Liquid]

In a 5 L beaker, 2,400 g of pure water and a stirring element were placed, and the beaker was placed on a magnetic stirrer. To the pure water, 56 g of the pulverized multi-walled carbon nanotubes obtained in Manufacturing Example 3, 20 g of the graphitized carbon nanofiber obtained in Manufacturing Example 6, and 24 g of carbon black particles (Ketjenblack EC300J, manufactured by Lion Specialty Chemicals Co., Ltd.) were added, and stirred for 5 minutes. Then, the mixed liquid was put in a tank for a Nanovater manufactured by Yoshida Kikai Co., Ltd.

[High-Pressure Dispersion Treatment]

The mixed liquid in the tank was transferred to a slurry pump with a squeeze pump, and then pressed into a straight nozzle (nozzle diameter: 190 μm) with the slurry pump at 150 MPa. The liquid subjected to the high-pressure treatment with the straight nozzle was passed through a heat exchanger, and collected to a 5 L beaker. The liquid was filtered with a filter paper (5C) placed in a Nutsche under reduced-pressure condition by a water-jet pump. The obtained cake-like solid substance was placed on a porcelain dish, and dried for 9 hours in a hot air drying oven set at 150° C. The resulting dried substance was crushed for 1 minute with the juicer mixer to obtain the composite powder comprising multi-walled carbon nanotubes, carbon black particles and graphitized carbon nanofiber.

Manufacturing Example 8: Production of a Multi-Walled Carbon Nanotube Paste (Paste A)

1.25 parts by mass of a dispersing agent (polyvinyl pyrolidone; hereinafter referred to as "PVP"; specific value of viscosity (K value)=90; manufactured by Kanto Chemical Co., Inc.) was put in 93.8 parts by mass of N-methylpyrolidone (manufactured by SHOWA DENKO K. K.), and mixed with a stirring device until the total amount of PVP was dissolved. After the total amount of PVP was dissolved, 5 parts by mass of the pulverized multi-wall carbon nanotubes obtained in Manufacturing Example 3 was put therein in appropriate amount batches while stirring the solution to produce a multi-walled carbon nanotube mixed liquid (mixed liquid A). The content of multi-walled carbon nanotubes was adjusted to 5 mass %.

The dispersion of the multi-walled carbon nanotubes was conducted with a high-pressure dispersing device manufactured by Sugino Machine Limited. The mixed liquid stirred in the material tank was transferred to the dispersing device with a slurry pump. After applying pressure so as to adjust the pressure inside the device to 200 MPa, the mixed liquid was sprayed from a straight nozzle (nozzle diameter: 150 μm). After cooling the liquid that passed through the straight nozzle through a heat exchanger was returned to the same material tank. The high-pressure dispersion treatment was repeatedly conducted until the value calculated from the formula of "material feeding rate [g/min.]×time [min.]/mass of materials [g]" came to 20. After the completion of the treatment, the liquid that processed to a paste-like material was collected from the tank to be used as a multi-walled carbon nanotube paste (paste A).

Each of the liquid before the dispersion treatment (mixed liquid A) and the liquid after the dispersion treatment (paste A) of multi-walled carbon nanotubes was applied on an aluminum foil and the dried to be observed by a scanning electron microscope. The observed images are shown in FIG. 7 and FIG. 8.

As a result of observing 10 fields (the area of one field: 70 μm×70 μm) at a magnification of 2,000, there were no field in which ten or more multi-walled carbon nanotube aggregates having an aggregate size of 1 μm or more were observed.

Manufacturing Example 9: Production of a Paste Comprising Carbon Black Particles and Graphitized Carbon Nanofiber (Paste B)

1.25 parts by mass of a dispersing agent (PVP; specific value of viscosity (K value)=90; manufactured by Kanto Chemical Co., Inc.) was put in 93.8 parts by mass of N-methylpyrolidone (manufactured by SHOWA DENKO K. K.), and mixed with a stirring device until the total amount of PVP was dissolved. After the total amount of PVP was dissolved, 3.65 parts by mass of Ketjenblack and 1.35 parts by mass of the graphitized carbon nanofiber obtained in Manufacturing Example 6 were put therein to produce a mixed liquid (mixed liquid B). The content of carbon materials in mixed liquid B was adjusted to 5 mass %.

The dispersion of the Ketjenblack and the graphitized carbon nanofiber was conducted with a dispersing device with a rotor/stator manufactured by IKA. The mixed liquid stirred in the material tank passed through the rotor at a rotation rate of 150,000 rpm (circumferential velocity of 24 m/s). The mixed liquid that passed through the rotor was returned to the same material tank. The dispersion treatment of the mixed liquid was repeatedly conducted until the value calculated from the formula of "material feeding rate [g/min.]×time [min.]/mass of materials [g]" came to 20. After the completion of the treatment, the liquid that processed to a paste-like material was collected to be used as a mixed paste of Ketjenblack and graphitized carbon nanofiber (paste B).

Each of the liquid before the dispersion treatment (mixed liquid B) and the liquid after the dispersion treatment (paste B) of Ketjenblack and graphitized carbon nanofiber was applied on an aluminum foil and dried to be observed by a scanning electron microscope. The observed images are shown in FIG. 9 and FIG. 10.

As a result of observing 10 fields (the area of one field: 70 μm×70 μm) at a magnification of 2,000, there were no field in which ten or more graphitized carbon nanofiber aggregates having an aggregate size of 1 μm or more were observed.

Example 1: Production of a Composite Paste Comprising Multi-Walled Carbon Nanotubes, Ketjenblack and Graphitized Carbon Nanofiber The treatment of mixing paste A and paste B was conducted by a dispersing device with a rotor/stator manufactured by IKA. 63 parts by mass of the paste A and 37 parts by mass of the paste B were put in a material tank and mixed by a stirring device. The mixed paste passed through the rotor at a rotation rate of 150,000 rpm (circumferential velocity of 24 m/s). The mixed liquid that passed through the rotor was returned to the same material tank. The mixing treatment was repeatedly conducted until the value calculated from the formula of "material feeding rate [g/min.]×time [min.]/mass of materials [g]" came to 5. The obtained paste was applied onto an aluminum foil and the dried to be observed by a scanning electron microscope. The observed image is shown in FIG. 11. As a result of observing 10 fields (the area of one field: 70 μm×70 μm) at a magnification of 2,000, there were no field in which ten or more multi-walled carbon nanotube aggregates having an aggregate size of 1 μm or more were observed or graphitized carbon nanofiber aggregates having an aggregate size of 10 μm or more were observed.

Referential Example

The optimum ratio by mass of carbon black particles and multi-walled carbon nanotubes was examined.

Referential Example 1

Manufacturing Example of a Positive Electrode 96.5 g of the positive electrode active substance (nickel manganese lithium cobaltite, manufactured by Umicore, average particle diameter: 7.5 μm) and 3 g of a binder (PVdF manufactured by ARKEMA, Kynar (registered trademark) HSV900) were put in a planetary mixer (manufactured by PRIMIX Corporation, Hivis Mix (registered trademark) 2P-03) and mixed by a dry process at an orbital speed of 15 rpm for 5 minutes. The mixture by a dry process was adjusted to have such a solid content at which shear stress can be applied efficiently by adding N-methylpyrrolidone (manufactured by SHOWA DENKO K. K.) to the resulting mixture by a dry process, and kneaded at an orbital speed of 45 rpm or more for 60 minutes. Then, 10 g of the multi-walled carbon nanotubes (paste A) obtained in Manufacturing Example 8 was added thereto and the mixture was kneaded at an orbital speed of 45 rpm or more for 30 minutes while applying shear stress. The obtained kneaded product was kneaded while further adding N-methylpyrrolidone (manufactured by SHOWA DENKO K. K.) thereto to thereby prepare a slurry having an optimal coating viscosity. It is to be noted that since the concentration of the paste prepared in Manufacturing Example 8 is 5 mass %, the multi-walled carbon nanotubes contained in the slurry weighs 0.5 g. The same holds true for Referential Examples 2 to 8 to be described below.

The obtained slurry was applied on an aluminum foil using a C-type coater with a coating weight of 15 mg/cm$^2$, and dried at 120° C. The obtained sheet was punched out in a predetermined size, and pressed using a roller press to obtain a positive electrode with an electrode density of 3.2 g/cm$^3$. The obtained positive electrode was dried in vacuum at 120° C. and used as a positive electrode for evaluating the battery characteristics.

Manufacturing Example of a Negative Electrode 96.2 g of a negative electrode active material (graphite particles SCMG (Registered Trademark); manufactured by Showa Denko K.K., the mean particle diameter: 6 μm), 86.7 g of gel-like aqueous solution containing 1.5 mass % of carboxymethyl cellulose (CMC; manufactured by Daicel Corporation), 6.1 g of water dispersion containing 40.7 mass % of Polysol (manufactured by SHOWA DENKO K.K.) were mixed. The mixture was kneaded using a planetary mixer (manufactured by PRIMIX Corporation) to thereby prepare a slurry for a negative electrode.

The obtained slurry was applied on a copper foil using a C-type coater with a coating weight of 9.2 mg/cm$^2$, and dried at a temperature of 70 to 90° C. The obtained sheet was punched out in a predetermined size, and pressed using a roller press to obtain a negative electrode with an electrode density of 1.3 g/cm$^3$.

Manufacturing Example of a Cell for Evaluation

The positive electrode and the negative electrode were layered on the both sides of a separator (a polypropylene microporous film; thickness of 25 μm) to produce a layered product. The layered product was wrapped with aluminium laminate film, and then heat-sealed at the three sides. An electrolytic solution was injected in the layered product, and then the rest one side of the aluminium laminate film was vacuum-sealed to obtain a test cell.

As the electrolytic solution, a solution containing a mixed solvent prepared by dissolving 1 mol/L of $LiPF_6$ as an electrolyte in a mixed solvent comprising 3 parts by mass of EC (ethylene carbonate), 2 parts by mass of DEC (diethylene carbonate) and 5 parts by mass of EMC (ethylmethyl carbonate) was used.

[Impedance Measurement]

Charge and discharge were performed for an evaluation cell by the following method. First, constant current charge was performed at a current equivalent to 0.2 C from the rest potential to 4.2 V in an environment of 25° C., and after reaching 4.2 V, constant voltage charge at 4.2 V was performed until the value of current decreased to a value equivalent to 0.02 C.

Next, constant current discharge was performed at a current equivalent to 0.2 C, and cut off at a voltage of 2.8 V. The ten repetitions of the operation was conducted and referred to as the conditioning. The cell after the completion of the conditioning was left to stand still in a constant-temperature bath at 25° C. for three hours and measured for the internal impedance in the cell. Potentio Galvanostat (manufactured by Bio-Logic Science Instruments, VMP3) having a built-in frequency analyzer was used for the impedance measurement. The frequency ranging from 100 kHz to 0.1 Hz was scanned and the impedance at 0.1 Hz was measured. The results are shown in Table 2.

Referential Example 2

A cell for evaluation was manufactured in the same way as in Referential Example 1 except that the conductive assistant to be added to the positive electrode was changed to 9 g of the multi-walled carbon nanotube paste (paste A) obtained in Manufacturing Example 8 and 0.05 g of Ketjenblack EC300J (manufactured by Lion Specialty Chemicals Co., Ltd.; BET specific surface area: 800 m²/g; the same goes for all the Ketjenblack described below) to measure the impedance at 0.1 Hz. The results are shown in Table 2.

Referential Example 3

A cell for evaluation was manufactured in the same way as in Referential Example 1 except that the conductive assistant to be added to the positive electrode was changed to 7 g of paste A obtained in Manufacturing Example 8 and 0.15 g of Ketjenblack to measure the impedance at 0.1 Hz. The results are shown in Table 2.

Referential Example 4

A cell for evaluation was manufactured in the same way as in Referential Example 1 except that the conductive assistant to be added to the positive electrode was changed to 5 g of paste A obtained in Manufacturing Example 8 and 0.25 g of Ketjenblack to measure the impedance at 0.1 Hz. The results are shown in Table 2.

Referential Example 5

A cell for evaluation was manufactured in the same way as in Referential Example 1 except that the conductive assistant to be added to the positive electrode was changed to 4 g of paste A obtained in Manufacturing Example 8 and 0.3 g of Ketjenblack to measure the impedance at 0.1 Hz. The results are shown in Table 2.

Referential Example 6

A cell for evaluation was manufactured in the same way as in Referential Example 1 except that the conductive assistant to be added to the positive electrode was changed to 2 g of paste A obtained in Manufacturing Example 8 and 0.4 g of Ketjenblack to measure the impedance at 0.1 Hz. The results are shown in Table 2.

Referential Example 7

A cell for evaluation was manufactured in the same way as in Referential Example 1 except that the conductive assistant to be added to the positive electrode was changed to 1 g of paste A obtained in Manufacturing Example 8 and 0.45 g of Ketjenblack to measure the impedance at 0.1 Hz. The results are shown in Table 2.

Referential Example 8

A cell for evaluation was manufactured in the same way as in Referential Example 1 except that the conductive assistant to be added to the positive electrode was changed to 0.5 g of Ketjenblack to measure the impedance at 0.1 Hz. The results are shown in Table 2.

TABLE 2

|  | Mass of paste A in conductive assistant (g) | Mass of multi-walled carbon nanotubes contained in paste A (g) | Mass of carbon black particles in conductive assistant (g) | Ratio by mass (carbon black particles/multi-walled carbon nanotubes) | Impedance at 0.1 Hz (Ω) |
| --- | --- | --- | --- | --- | --- |
| Referential Example 1 | 10 | 0.5 | 0 | 0.0 | 1.85 |
| Referential Example 2 | 9 | 0.45 | 0.05 | 0.1 | 1.52 |
| Referential Example 3 | 7 | 0.35 | 0.15 | 0.4 | 1.28 |
| Referential Example 4 | 5 | 0.25 | 0.25 | 1.0 | 1.33 |
| Referential Example 5 | 4 | 0.2 | 0.30 | 1.5 | 1.38 |
| Referential Example 6 | 2 | 0.1 | 0.40 | 4.0 | 1.49 |

TABLE 2-continued

| | Mass of paste A in conductive assistant (g) | Mass of multi-walled carbon nanotubes contained in paste A (g) | Mass of carbon black particles in conductive assistant (g) | Ratio by mass (carbon black particles/multi-walled carbon nanotubes) | Impedance at 0.1 Hz (Ω) |
|---|---|---|---|---|---|
| Referential Example 7 | 1 | 0.05 | 0.45 | 9.0 | 1.56 |
| Referential Example 8 | 0 | 0 | 0.50 | — | 1.72 |

The result obtained from Table 2 shows that when the ratio by mass of carbon black particles to the multi-walled carbon nanotube (mass of carbon black particles/mass of multi-walled carbon nanotube) in the conductive assistant is in the range of 0.1 to 4.0, the impedance becomes lower than the case where either the multi-walled carbon nanotubes or the carbon black particles is used as a conductive additive. Particularly, it showed a significant effect that the impedance becomes lowest when the ratio is 0.4.

The evaluation results of the charge characteristics and the cycle retention rate at a low temperature when the electrically conductive paste in one embodiment of the present invention and various carbon materials were used as a conductive assistant are given below. It is to be noted that when the electrically conductive paste was used, the ratio by mass of the carbon black particles to the multi-walled carbon nanotubes was fixed to 0.43.

[Charge Characteristics at a Low Temperature]

Charge and discharge were performed for an evaluation cell by the following method. First, constant current charge was performed at a current equivalent to 0.2 C from the rest potential to 4.2 V in an environment of 25° C., and after reaching 4.2 V, constant voltage charge at 4.2 V was performed until the value of current decreased to a value equivalent to 0.02 C. Next, constant current discharge was performed at a current equivalent to 0.2 C, and cut off at a voltage of 2.8 V. The ten repetitions of the operation was conducted and referred to as the conditioning. The charge capacity after the tenth operation was defined as the charge capacitance at 25° C.

Next, after leaving the cell for evaluation to stand still in an environment of −20° C. for three hours, constant current charge was performed at a current equivalent to 0.5 C and cut off at a voltage of 4.2 V. The charge capacity at this time was defined as the charge capacitance at −20° C. The ratio of the charge capacitance at −20° C. to the charge capacitance at 25° C. was calculated and used as an index of the charge characteristics at a low temperature.

[Cycle Characteristics at a Low Temperature]

After leaving the cell for evaluation after the completion of the conditioning to stand still in an environment of 0° C. for three hours, constant current charge was performed at a current equivalent to 1.0 C from the rest potential to 4.2 V, and after reaching 4.2 V, constant voltage charge at 4.2 V was performed until the value of current decreased to a value equivalent to 0.02 C. Next, constant current discharge was performed at a current equivalent to 1.0 C, and cut off at a voltage of 2.8 V. The set of charge and discharge operations was counted as one cycle, and 50 cycles were conducted. The ratio of the cell capacitance in the fiftieth cycle to that in the first cycle was calculated and used as an index of the cycle characteristics at a low temperature.

Example 2

The electrically conductive paste was manufactured in the same way as in Example 1 except that the ratio by mass of the carbon black particles/the multi-walled carbon nanotubes contained in the electrically conductive paste was set to 0.43 and the content of the graphitized carbon nanofiber was set to 10 mass %.

Example 3

The electrically conductive paste was manufactured in the same way as in Example 1 except that the ratio by mass of the carbon black particles/the multi-walled carbon nanotubes contained in the electrically conductive paste was set to 0.43 and the content of the graphitized carbon nanofiber was set to 20 mass %.

Example 4

The electrically conductive paste was manufactured in the same way as in Example 1 except that the ratio by mass of the carbon black particles/the multi-walled carbon nanotubes contained in the electrically conductive paste was set to 0.43 and the content of the graphitized carbon nanofiber was set to 40 mass %.

Comparative Example 1

The electrically conductive paste was manufactured in the same way as in Example 1 except that the ratio by mass of the carbon black particles/the multi-walled carbon nanotubes contained in the electrically conductive paste was set to 0.43 and the content of the graphitized carbon nanofiber was set to 2 mass %.

Comparative Example 2

The electrically conductive paste was manufactured in the same way as in Example 1 except that the ratio by mass of the carbon black particles/the multi-walled carbon nanotubes contained in the electrically conductive paste was set to 0.43 and the content of the graphitized carbon nanofiber was set to 60 mass %.

Comparative Example 3

A composite powder was manufactured in the same way as in Manufacturing Example 7 except that the ratio by mass of the carbon black particles/the multi-walled carbon nanotubes was set to 0.43 and the content of the graphitized carbon nanofiber was set to 20 mass %.

Evaluation Examples 1 to 5

A cell for evaluation was manufactured in the same way as in Referential Example 1 except that 60 g of the electrically conductive pastes obtained in Examples 2 to 4 and Comparative Examples 1 to 2 were used as a conductive assistant in the positive electrode instead of paste A obtained in Manufacturing Example 8, and the cells were evaluated for the charge characteristics at a low temperature and the cycle characteristics at a low temperature.

Evaluation Example 6

A cell for evaluation was manufactured in the same way as in Referential Example 1 except that 3 g of the composite powder obtained in Comparative Example 3 was used as a conductive assistant in the positive electrode instead of paste A obtained in Manufacturing Example 8, and the cell was evaluated for the charge characteristics at a low temperature and the cycle characteristics at a low temperature.

Evaluation Example 7

A cell for evaluation was manufactured in the same way as in Referential Example 1 except that 40 g of paste A obtained by the method of Manufacturing Example 8 and 1 g of Ketjenblack were used as a conductive assistant in the positive electrode, and the cell was evaluated for the charge characteristics at a low temperature and the cycle characteristics at a low temperature.

Evaluation Example 8

A cell for evaluation was manufactured in the same way as in Referential Example 1 except that 20 g of paste A obtained by the method of Manufacturing Example 8 and 2 g of graphitized carbon nanofiber were used as a conductive assistant in the positive electrode, and the cell was evaluated for the charge characteristics at a low temperature and the cycle characteristics at a low temperature.

Evaluation Example 9

A cell for evaluation was manufactured in the same way as in Referential Example 1 except that 60 g of paste A obtained by the method of Manufacturing Example 8 was used as a conductive assistant in the positive electrode, and the cell was evaluated for the charge characteristics at a low temperature and the cycle characteristics at a low temperature.

Evaluation Example 10

A cell for evaluation was manufactured in the same way as in Referential Example 1 except that 3 g of Ketjenblack was used as a conductive assistant in the positive electrode, and the cell was evaluated for the charge characteristics at a low temperature and the cycle characteristics at a low temperature.

Evaluation Example 11

A cell for evaluation was manufactured in the same way as in Referential Example 1 except that 2 g of Ketjenblack and 1 g of graphitized carbon nanofiber were used as a conductive assistant in the positive electrode, and the cell was evaluated for the charge characteristics at a low temperature and the cycle characteristics at a low temperature.

TABLE 3

| | Mass of multi-walled carbon nanotubes contained in conductive assistant (g) | Mass of carbon black particles contained in conductive assistant (g) | Mass of graphitized carbon nanofiber contained in conductive assistant (g) | Ratio by mass (carbon black particles/multi-walled carbon nanotubes) | Content of graphitized carbon nanofiber (mass %) | Mass of carbon materials in conductive assistant (g) | Charge characteristics at a low temperature (%) | Cycle retention rate at a low temperature (%) |
|---|---|---|---|---|---|---|---|---|
| Evaluation Ex. 1 (Example 2) | 1.89 | 0.81 | 0.3 | 0.43 | 10 | 3.0 | 69.0 | 97.0 |
| Evaluation Ex. 2 (Example 3) | 1.68 | 0.72 | 0.6 | 0.43 | 20 | 3.0 | 71.0 | 97.4 |
| Evaluation Ex. 3 (Example 4) | 1.26 | 0.54 | 1.2 | 0.43 | 40 | 3.0 | 70.0 | 96.8 |
| Evaluation Ex. 4 (Comparative Ex. 1) | 2.06 | 0.88 | 0.06 | 0.43 | 2 | 3.0 | 67.2 | 95.8 |
| Evaluation Ex. 5 (Comparative Ex. 2) | 0.84 | 0.36 | 1.8 | 0.43 | 60 | 3.0 | 65.0 | 95.8 |
| Evaluation Ex. 6 (Comparative Ex. 3) | 1.68 | 0.72 | 0.6 | 0.43 | 20 | 3.0 | 66.0 | 93.5 |
| Evaluation Ex. 7 | 2 | 1 | 0 | — | — | 3.0 | 67.5 | 95.7 |
| Evaluation Ex. 8 | 1 | 0 | 2 | — | — | 3.0 | 63.7 | 96.0 |
| Evaluation Ex. 9 | 3 | 0 | 0 | — | — | 3.0 | 62.2 | 95.4 |
| Evaluation Ex. 10 | 0 | 3 | 0 | — | — | 3.0 | 67.0 | 90.3 |
| Evaluation Ex. 11 | 0 | 2 | 1 | — | — | 3.0 | 65.3 | 92.5 |

Evaluation Examples 1 to 5: Electrically Conductive Paste (Paste A+Paste B)

Evaluation Example 6: Composite Powder

Evaluation Example 7: Paste A+Ketjenblack

Evaluation Example 8: Paste A+Graphitized Carbon Nanofiber

Evaluation Example 9: Paste A

Evaluation Example 10: Ketjenblack

Evaluation Example 11: Ketjenblack+Graphitized Carbon Nanofiber

As is clear from Table 3, the charge characteristics and the cycle retention rate at a low temperature are improved in Evaluation Examples 1 to 3 (Examples 2 to 4) compared to Evaluation Examples 4 to 11. Evaluation Examples 1 to 3 uses an electrically conductive paste having a graphitized carbon nanofiber content of 10 to 40 mass %, and it can be said that the content range is the optimum range. The graphitized carbon nanofiber has a longer fiber length and higher rigidity than multi-walled carbon nanotubes. Hence, it forms a network having a three-dimensional interpenetrating structure with carbon black particles and multi-walled carbon nanotubes. The three-dimensional network formed in an electrode can contain more electrolyte solution, and therefore it not only improves the charge characteristics at a low temperature but also forms a short- and long-distance conductive paths and has a major effect of suppressing the increase in resistance due to the charge and discharge cycle. If the content of the graphitized carbon nanofiber is too high or too low as in Evaluation Examples 4 and 5 (Comparative Examples 1 and 2), the three-dimensional network structures become difficult to be formed, and it is thought to be the cause of degradation of the characteristics at a low temperature.

In Evaluation Example 6, though having the same content of the graphitized carbon nanofiber, using a composite powder that is obtained in Manufacturing Example 7 (Comparative Example 3), the multi-walled carbon nanotubes have low dispersibility. Therefore, it results in not only the increase in the electric resistance but also an unequal voltage distribution in the electrode, and it is deemed to degrade the cycle characteristics at a low temperature. On the other hand, the results in Evaluation Examples 7 to 11, in which a conductive assistant that does not contain all of the three kinds of carbon materials was used in a positive electrode, were inferior to Evaluation Examples 1 to 3 (Examples 2 to 4) in terms of the charge characteristics and the cycle retention rate at a low temperature.

INDUSTRIAL APPLICABILITY

The battery containing the electrically conductive paste of the present invention as a conductive assistant has improved charge characteristics and cycle retention rate at a low temperature compared to a conventional battery, and can be suitably used in a wide range of applications as in-vehicle products for hybrid automobiles, power storage products and the like in which further progress is expected.

DESCRIPTION OF NUMERICAL SYMBOLS

1 Voltage measurement terminal
2 Compression rod
3 Current terminal
4 Cell
5 Measured object

The invention claimed is:
1. A method for producing an electrically conductive paste, comprising a step of manufacturing a paste A by exerting a cavitation effect on a mixed liquid A containing multi-walled carbon nanotubes and a solvent, a step of manufacturing a paste B from a mixed liquid B containing carbon black particles, graphitized carbon nanofibers and a solvent, and a step of mixing the paste A and the paste B.
2. The method for producing an electrically conductive paste as claimed in claim 1, comprising a method of adding a dispersing agent to the mixed liquid A and/or the mixed liquid B.
3. The method for producing an electrically conductive paste as claimed in claim 1, further comprising a method of applying shear force to the mixed liquid A.
4. The method for producing an electrically conductive paste as claimed in claim 3, in which the method of exerting a cavitation effect on and applying shear force to the mixed liquid A is a method of allowing the mixed liquid A to pass through a nozzle at a pressure within a range of 100 MPa or more and less than 250 MPa.

* * * * *